(12) United States Patent
Wang et al.

(10) Patent No.: US 11,572,862 B2
(45) Date of Patent: Feb. 7, 2023

(54) SEGMENTED BLADE, METHOD FOR CONNECTING SEGMENTED BLADES AND WIND POWER GENERATOR SET

(71) Applicant: JIANGSU GOLDWIND SCIENCE & TECHNOLOGY CO., LTD., Jiangsu (CN)

(72) Inventors: Xingbo Wang, Beijing (CN); Yu Zhu, Beijing (CN); Liufeng Hao, Beijing (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 189 days.

(21) Appl. No.: 16/759,110

(22) PCT Filed: May 21, 2018

(86) PCT No.: PCT/CN2018/087621
§ 371 (c)(1),
(2) Date: Apr. 24, 2020

(87) PCT Pub. No.: WO2019/128052
PCT Pub. Date: Jul. 4, 2019

(65) Prior Publication Data
US 2021/0190034 A1    Jun. 24, 2021

(30) Foreign Application Priority Data
Dec. 25, 2017 (CN) .......................... 201711418464.4

(51) Int. Cl.
*F03D 1/06* (2006.01)
(52) U.S. Cl.
CPC ...... *F03D 1/0675* (2013.01); *F05B 2240/301* (2013.01); *F05B 2240/302* (2013.01); *F05B 2260/30* (2013.01); *F05B 2280/6003* (2013.01)

(58) Field of Classification Search
CPC .. F03D 1/0675; F03D 13/10; F05B 2240/301; F05B 2240/302;
(Continued)

(56) References Cited

U.S. PATENT DOCUMENTS 7,654,799 B2 * 2/2010 Eyb ...................... F03D 1/0675
416/232
7,901,188 B2 * 3/2011 Llorente Gonzalez ......................
F03D 1/0675
416/223 R
(Continued)

FOREIGN PATENT DOCUMENTS

CN    101151458 A    3/2008
CN    101718250 A    6/2010
(Continued)

OTHER PUBLICATIONS

Wang et al. CN 105526044 A ProQuestDocuments—May 24, 2022 (English Translation) (Year: 2016).*
(Continued)

*Primary Examiner* — David E Sosnowski
*Assistant Examiner* — Wayne A Lambert (57) ABSTRACT

A segmented blade, which includes a first blade segment having a first main beam, wherein the first main beam includes a first body portion disposed within the first blade segment and a first engaging portion extending from an end portion of the first body portion toward a direction which is away from the blade root; a second blade segment having a second main beam, wherein the second main beam includes a second body portion disposed within the second blade segment and a second engaging portion extending from an end portion of the second body portion toward a direction which approaches the blade root, and the second engaging portion being engaged in the first engaging portion; and an outer skin, which covers a gap between the first blade
(Continued)

segment and the second blade segment. Also provided are a method for connecting segmented blades and a wind power generator set.

18 Claims, 11 Drawing Sheets

(58) Field of Classification Search
CPC ............ F05B 2250/292; F05B 2260/30; F05B 2280/6003; Y02E 10/72
See application file for complete search history.

(56) References Cited

U.S. PATENT DOCUMENTS

| | | | | |
|---|---|---|---|---|
| 7,922,454 | B1* | 4/2011 | Riddell | F03D 1/0675 416/224 |
| 8,123,488 | B2* | 2/2012 | Finnigan | F03D 13/10 416/226 |
| 8,167,569 | B2* | 5/2012 | Livingston | F03D 1/0675 416/224 |
| 8,764,401 | B2* | 7/2014 | Hayden | F03D 1/0633 416/224 |
| 2006/0127222 | A1* | 6/2006 | Arelt | F03D 1/0683 416/224 |
| 2008/0219851 | A1* | 9/2008 | Althoff | F03D 1/0675 29/889.71 |
| 2009/0155084 | A1* | 6/2009 | Livingston | B29C 66/54 416/223 R |
| 2009/0208341 | A1 | 8/2009 | Llorente Gonzalez et al. | |
| 2010/0310379 | A1* | 12/2010 | Livingston | F03D 1/0675 29/889.71 |
| 2011/0052403 | A1 | 3/2011 | Kawasetsu et al. | |
| 2011/0189025 | A1 | 8/2011 | Hancock et al. | |
| 2011/0229336 | A1* | 9/2011 | Richter | B29C 65/601 156/92 |
| 2012/0100002 | A1 | 4/2012 | Kawasetsu et al. | |
| 2012/0213642 | A1 | 8/2012 | Wang et al. | |
| 2013/0129518 | A1* | 5/2013 | Hayden | B29C 70/84 416/226 |
| 2014/0169978 | A1 | 6/2014 | Livingston | |
| 2014/0286780 | A1* | 9/2014 | Lemos | F03D 80/50 29/889.71 |
| 2015/0110632 | A1 | 4/2015 | Rohden | |
| 2016/0369771 | A1* | 12/2016 | Feigl | F03D 1/0675 |
| 2017/0122287 | A1 | 5/2017 | Dobbe et al. | |
| 2018/0355843 | A1* | 12/2018 | Yarbrough | F03D 1/0683 |
| 2020/0088169 | A1* | 3/2020 | Lund-Laverick | F03D 13/10 |
| 2020/0392937 | A1* | 12/2020 | Burchardt | F03D 1/0675 |

FOREIGN PATENT DOCUMENTS

| | | | |
|---|---|---|---|
| CN | 101915222 | A | 12/2010 |
| CN | 101990599 | A | 3/2011 |
| CN | 102124215 | A | 7/2011 |
| CN | 102248678 | A | 11/2011 |
| CN | 103180609 | A | 6/2013 |
| CN | 105065196 | A | 11/2015 |
| CN | 204827790 | U | 12/2015 |
| CN | 105526044 | A | 4/2016 |
| CN | 205559177 | A | 9/2016 |
| EP | 2746573 | A2 | 6/2014 |
| EP | 2815861 | A1 | 12/2014 |
| JP | 2005147086 | A | 6/2005 |
| WO | 2010/023299 | A | 3/2010 |
| WO | 2014/053816 | A1 | 4/2014 |
| WO | 2015/189338 | A1 | 12/2015 |
| WO | WO-2020089024 | A1 * | 5/2020 ........... F03D 1/0675 |

OTHER PUBLICATIONS

The International Search Report dated Sep. 17, 2018; PCT/CN2018/087621.

Extended European Search Report dated Jan. 20, 2021; Appln. No. 18893995.3.

The First Chinese Office Action dated Mar. 4, 2019; Appln. No. 201711418464.4.

The Second Chinese Office Action dated Aug. 1, 2019; Appln. No. 201711418464.4.

* cited by examiner

Figure 1

Prior Art

Figure 2

Prior Art

Figure 3

Prior Art

SEGMENTED BLADE, METHOD FOR CONNECTING SEGMENTED BLADES AND WIND POWER GENERATOR SET

This application is the national phase of International Application No. PCT/CN2018/087621, titled "SEGMENTED BLADE, METHOD FOR CONNECTING SEGMENTED BLADES AND WIND POWER GENERATOR SET", filed on May 21, 2018, which claims the priority to Chinese Patent Application No. 201711418464.4, titled "SEGMENTED BLADE, METHOD FOR CONNECTING SEGMENTED BLADES AND WIND POWER GENERATOR SET", filed with China National Intellectual Property Administration on Dec. 25, 2017, the entire disclosures of which applications are incorporated herein by reference.

FIELD

The present application relates to the technical field of wind turbines, and particularly to a segmented blade, a method fir forming a segmented blade, and a wind turbine.

BACKGROUND

Wind turbines are used to convert wind energy into electrical energy. At present, with the increase of the megawatt level of the wind turbines, the length of the blade gradually increases. For the manufacture and transportation of the blade, the gradually increasing length of the blade becomes a prominent problem that restricts the development of the wind turbines.

SUMMARY

An object of the present application is to provide a segmented blade, which substantially do not increase the weight of the blade and has high reliability, a method of forming the segmented blade, and a wind turbine.

According to an aspect of the present application, a segmented blade is provided. The segmented blade includes a first blade segment having a first main spar, a second blade segment having a second main spar, and an outer shell. The first blade segment is close to a blade root, the first main spar includes a first body portion arranged in the first blade segment and a first clamping portion extending from an end of the first body portion toward a direction away from a blade root, and a height of the first clamping portion is gradually decreased in the direction away from the blade root. The second blade segment is close to a blade tip, the second main spar includes a second body portion arranged in the second blade segment and a second clamping portion extending from an end of the second body portion toward a direction getting close to the blade root, and a height of the second clamping portion is gradually increased in the direction getting close to the blade root. The second clamping portion is clamp-fitted into the first clamping portion. The outer shell is configured to encase a clearance between the first blade segment and the second blade segment.

According to another aspect of the present application, a method of forming a segmented blade is provided. The method includes: providing a first blade segment having a first main spar, wherein the first blade segment is close to a blade root, the first main spar includes a first body portion arranged in the first blade segment and a first clamping portion extending from an end of the first body portion toward a direction away from the blade root, and a height of the first clamping portion is gradually decreased in the direction away from the blade root; providing a second blade segment having a second main spar, wherein the second blade segment is close to a blade tip, the second main spar includes a second body portion arranged in the second blade segment and a second clamping portion extending from an end of the second body portion toward a direction getting close to the blade root, and a height of the second clamping portion is gradually increased in the direction getting close to the blade root; clamp-fitting the second clamping portion into the first clamping portion; and encasing, by an outer shell, a clearance between the first blade segment and the second blade segment.

According to yet another aspect of the present application, a wind turbine is provided. The wind turbine includes the above segmented blade.

BRIEF DESCRIPTION OF THE DRAWINGS

Through the following detailed description in conjunction with the drawings, the above and other objects, features and advantages of the present application will become more apparent.

REFERENCE NUMERALS 1 blade,
2 main spar,
21 main spar cap,
22 shear web,
100 first blade segment,
110 leading edge shell,
120 trailing edge shell,
130 first body portion,
140 first clamping portion,
150 first main spar,
151 main spar cap of the first main spar,
152 shear web of the first main spar, 153 gap,
200 second blade segment,
210 leading edge shell,
220 trailing edge shell,
230 second body portion,
240 second clamping portion,
250 second main spar,
251 main spar cap of the second main spar,
252 shear web of the second main spar,
300 reinforcing member,
400 outer shell.

DETAILED DESCRIPTION

Figure 1:
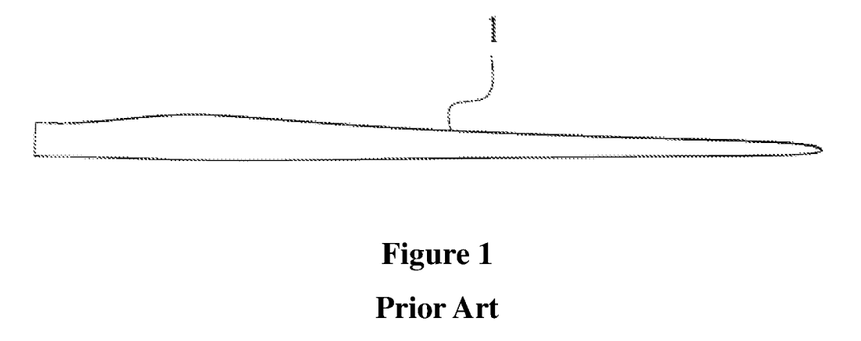
FIG. 1 is a schematic view of an outline of a conventional blade.
Figure 2:
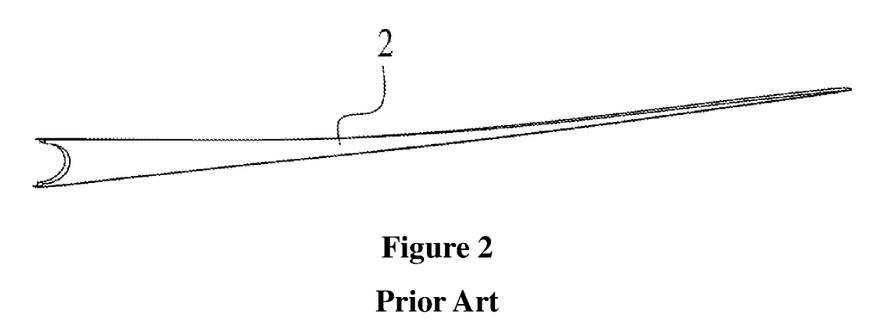
FIG. 2 is a schematic view showing a main spar of the blade.
Figure 3:
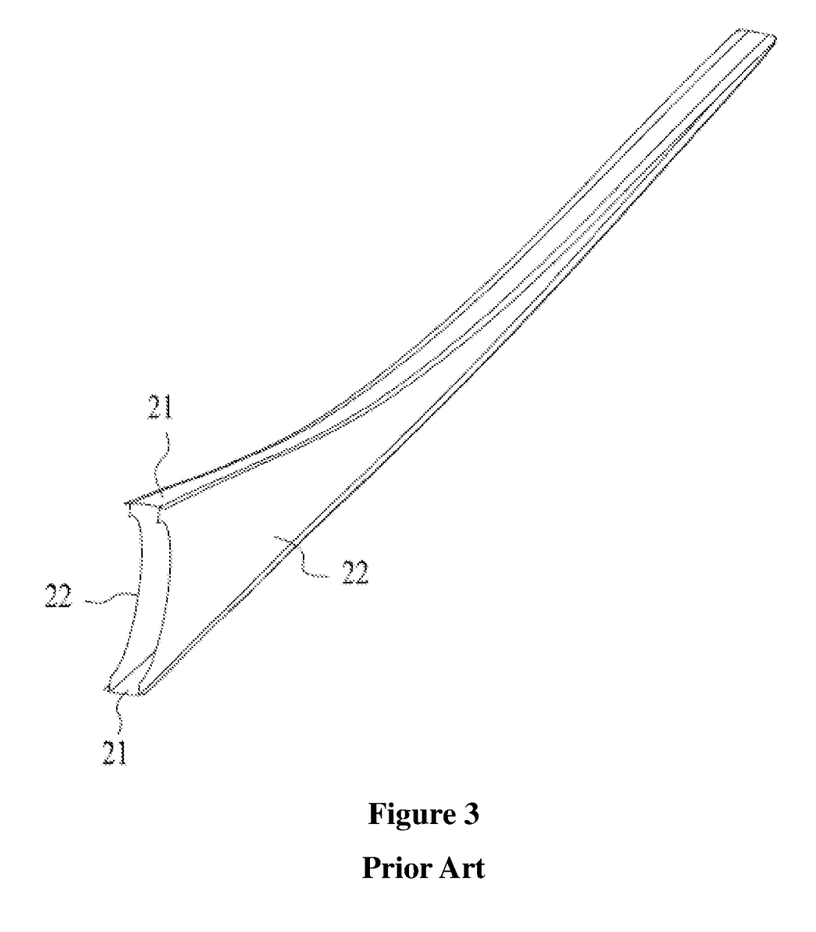
FIG. 3 is a schematic view showing the main spar of the blade in FIG. 2 in another direction.

First, a shape of a conventional blade will be described with reference to FIGS. 1 to 3. FIG. 1 is a schematic view of the shape of the conventional blade, FIG. 2 is a schematic view showing a main spar of the blade, and FIG. 3 is a schematic view showing the main spar of the blade in FIG. 2 in another direction.

A wind turbine may include a blade 1 in FIG. 1. As shown in FIG. 1, the blade 1 becomes thinner and thinner from a blade root to a blade tip. A main spar 2 in FIGS. 2 and 3 may be arranged in the blade 1. The main spar 2 may include two main spar caps 21 and two shear webs 22. One of the two main spar caps 21 may be arranged at an upper housing of the blade 1, and the other of the two main spar caps 21 may be arranged at a lower housing of the blade 1, The two shear webs 22 are configured to support the two main spar caps 21 at two sides of the two main spar caps 21. As shown in FIG. 3, heights of the shear webs 22 become smaller and smaller, that is, a distance between the two main spar caps 21 becomes smaller and smaller. In addition, a distance between the two shear webs 22 may become smaller and smaller, or may be unchanged.

A segmented blade according to an embodiment of the present application makes hill use of a feature that the blade 1 shown in FIG. 1 becomes thinner and thinner from the blade root to the blade tip, and the main spar 2 of the segmented blade is used for clamping and limiting connection. Hereinafter, the segmented blade according to the embodiment of the present application will be described in detail with reference to FIGS. 4 to 13.

As shown in FIGS. 4 to 13, the segmented blade may include: a first blade segment 100 having a first main spar 150, wherein the first blade segment 100 is close to the blade root, the first main spar 150 includes a first body portion 130 arranged in the first blade segment 100 and a first clamping portion 140 extending from an end of the first body portion 130 toward a direction D1 away from the blade root, and a height of the first clamping portion 140 is gradually decreased in the direction D1 away from the blade root; a second blade segment 200 having a second main spar 250, wherein the second blade segment 200 is close to a blade tip, the second main spar 250 includes a second body portion 230 arranged in the second blade segment 200 and a second clamping portion 240 extending from an end of the second body portion 230 toward a direction D3 getting close to the blade root, and a height of the second clamping portion 240 is gradually increased in the direction D3 getting close to the blade root, where the second clamping portion 240 is clamp-fitted into the first clamping portion 140; and an outer shell 400 configured to encase a clearance G between the first blade segment 100 and the second blade segment 200.

Figure 4:
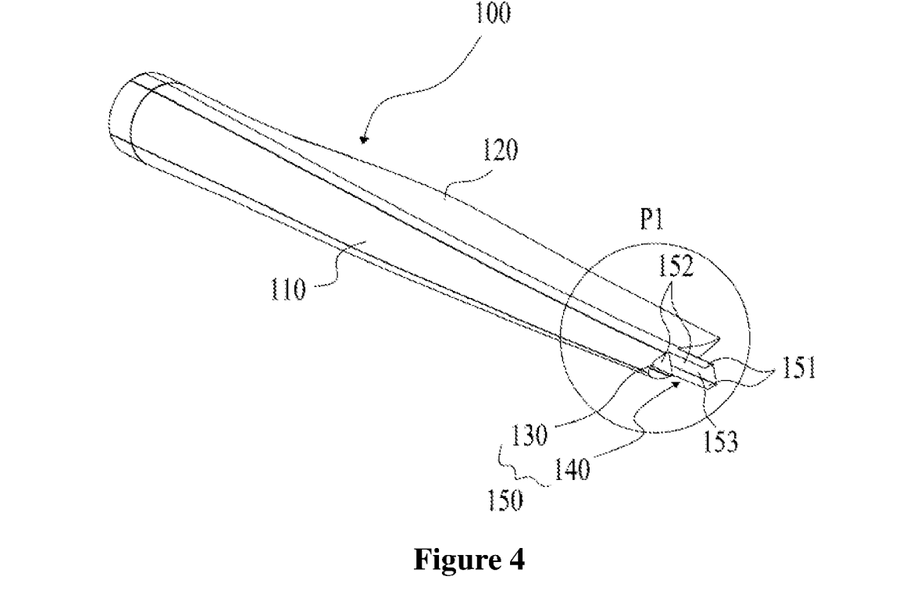
FIG. 4 is a schematic view showing a first blade segment according to an embodiment of the present application.
Figure 5:
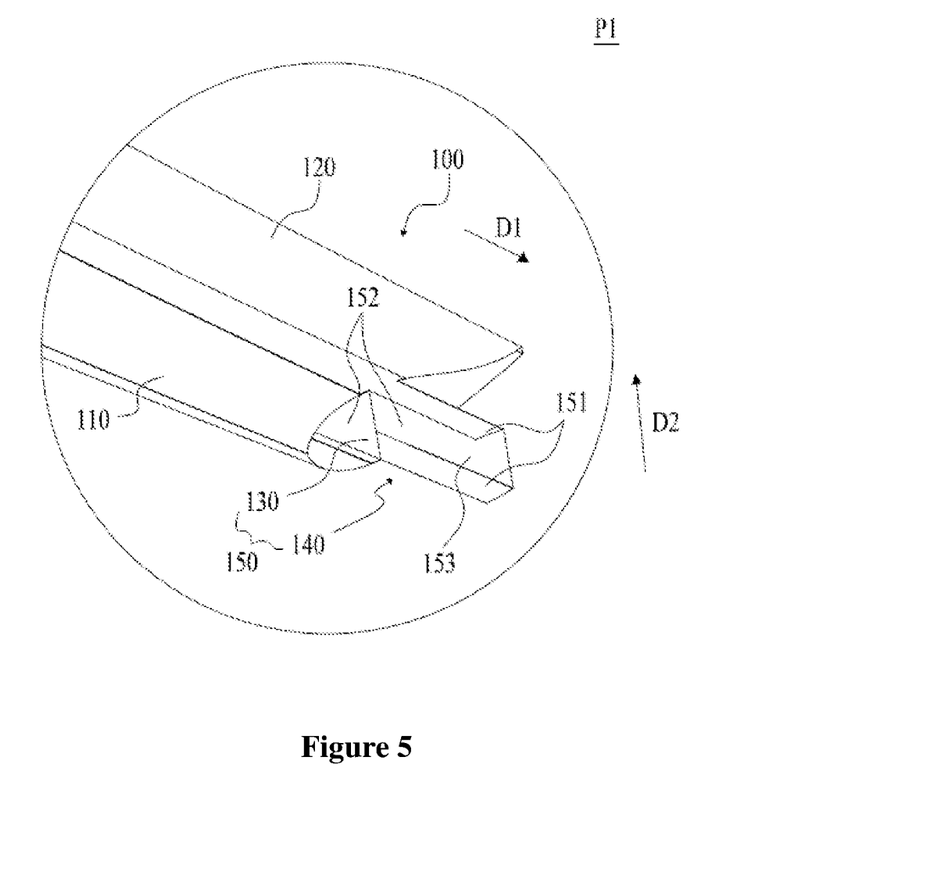
FIG. 5 is an enlarged schematic view showing a portion P1 of the first blade segment in FIG. 4.
Figure 6:
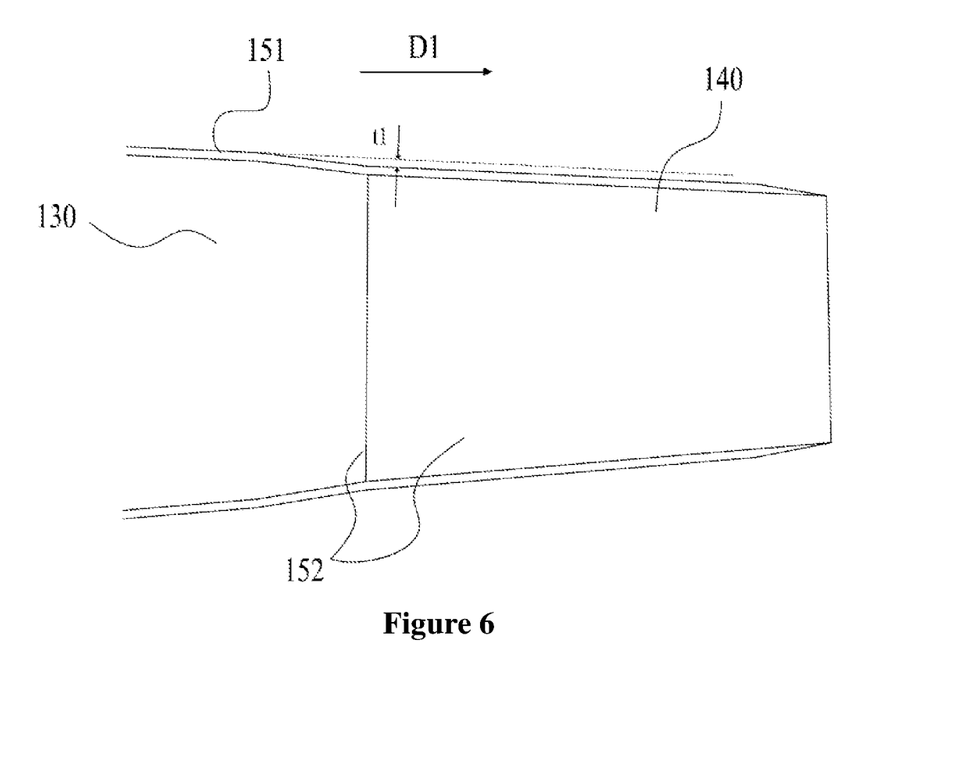
FIG. 6 is a schematic view showing a first main spar of the first blade segment in FIG. 4.

As shown in FIGS. 4 to 6, at a side of the first blade segment 100 close to the blade root, the first blade segment 100 may include a leading edge shell 110 and a trailing edge shell 120. An upper half housing of the leading edge shell 110 and an upper half housing of the trailing edge shell 120 may form an upper housing of the first blade segment 100, and a lower half housing of the leading edge shell 110 and a lower half housing of the trailing edge shell 120 may form a lower housing of the first blade segment 100.

The first main spar 150 may include two main spar caps 151 and two shear webs 152, wherein the two main spar caps 151 may be arranged at the upper housing and the lower housing of the first blade segment 100, respectively, and the two shear webs 152 may be arranged at two sides of the two main spar caps 151 respectively, to support the two main spar caps 151.

Optionally, the first clamping portion 140 may be formed by extending any three of the two main spar caps 151 and the two shear webs 152 of the first main spar 150 in the direction D1 away from the blade root.

FIGS. 4 and 5 shows an example in which the first clamping portion 140 is formed by extending the two main spar caps 151 and one shear web 152, However, the present application is not limited thereto, and the first clamping portion 140 may also be formed by extending one main spar cap 151 and the two shear webs 152. A gap 153 is formed in the first clamping portion 140 because one of the main spar caps 151 or one of the shear webs 152 is not extended. Hereinafter, description will be made by taking a case that the gap 153 is formed because the shear web 152 is not extended as an example.

Referring to FIGS. 1 and 3, the heights of the shear webs 22 are gradually decreased from the blade root to the blade tip of the blade 1. Therefore, according to the embodiment of the present application, as shown in FIG. 6, along the direction D1 away from the blade root, a height of the first clamping portion 140 in a thickness direction D2 of an airfoil (that is, the heights of the shear webs 152 in FIG. 4) is gradually decreased, Therefore, in general, the first clamping portion 140 may be formed in a tubular shape having an opening gradually decreasing in the direction D1 away from the blade root and having the gap 153.

In addition, as shown in FIG. 6, according the embodiment of the present application, each of the main spar caps 151 of the first clamping portion 140 may be concaved with respect to an extension line of the corresponding main spar cap 151 in the first body portion 130, to form a first step t1 between the first clamping portion 140 and the first body portion 130, and a height of the first step t1 may range from 6 mm to 10 mm.

When the first main spar 150 is manufactured, each of the main spar caps 151 of the first clamping portion 140 may be concaved by an amount of the first step t1 in the thickness direction D2 of the airfoil, that is, each of the main spar caps 151 of the first clamping portion 140 may be concaved by the amount of the first step t1 with respect to the design of an original main spar cap, thereby providing a space for the subsequent process of winding a reinforcing member 300 (described in detail below).

Figure 7:
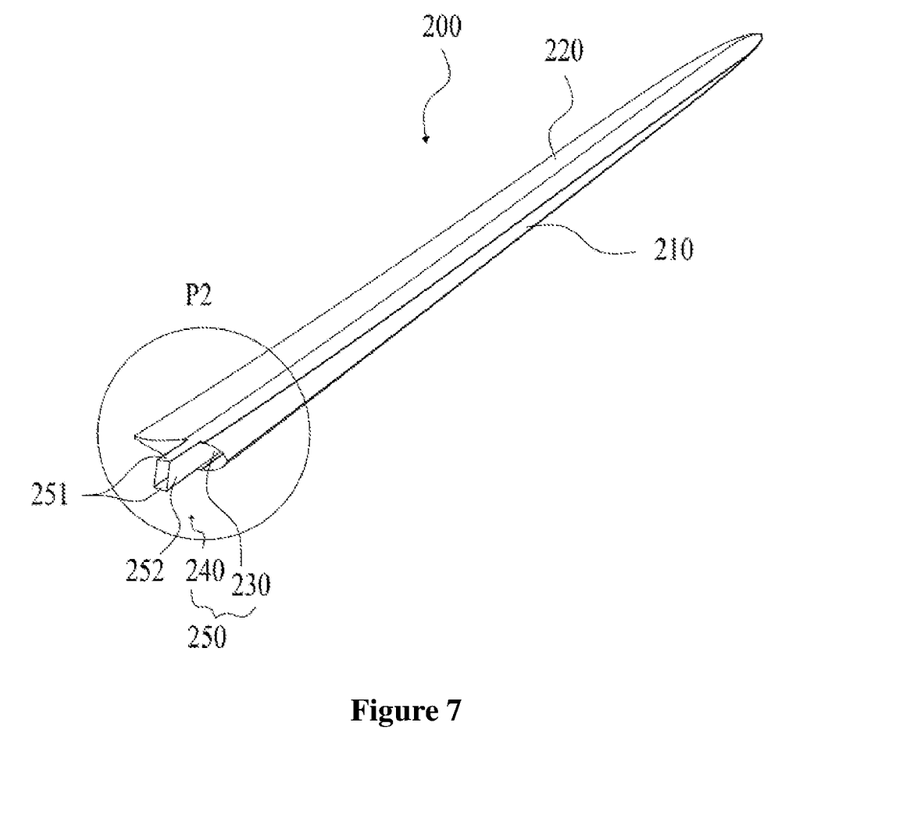
FIG. 7 is a schematic view showing a second blade segment according to the embodiment of the present application.
Figure 8:
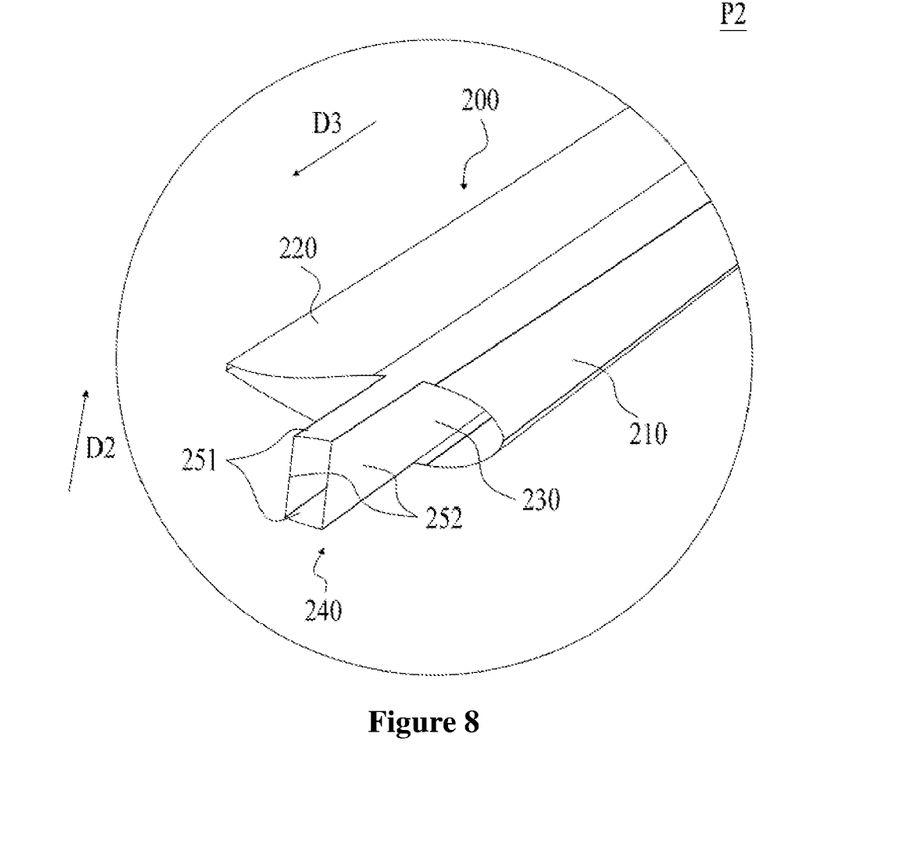
FIG. 8 is an enlarged schematic view showing a portion P2 of the second blade segment in FIG. 7.
Figure 9:
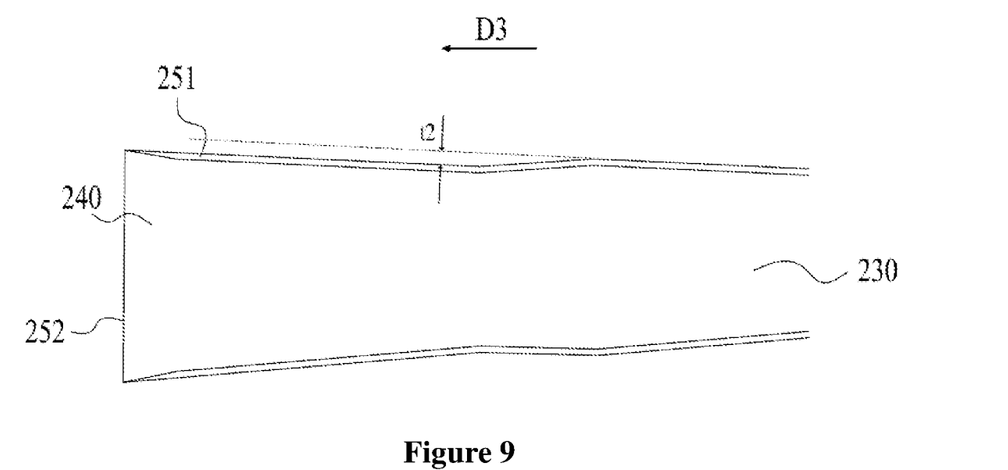
FIG. 9 is a schematic view showing a second main spar of the second blade segment in FIG. 7.

As shown in FIGS. 7 to 9, at a side of the second blade segment 200 close to the blade root, the second blade segment 200 may include a leading edge shell 210 and a trailing edge shell 220. An upper half housing of the leading edge shell 210 and an upper half housing of the trailing edge shell 220 may form an upper housing of the second blade segment 200, and a lower half housing of the leading edge shell 210 and a lower half housing of the trailing edge shell 220 may form a lower housing of the second blade segment 200.

The second main spar 250 may include two main spar caps 251 and two shear webs 252, wherein the two main spar caps 251 may be arranged at the upper housing and the lower housing of the second blade segment 200, respectively, and the two shear webs 252 may be arranged at two sides of the two main spar caps 251 respectively, to support the two main spar caps 251.

Considering the clamping stability between the second clamping portion 240 and the first clamping portion 140 and the stability of the blade after the segmented blade is formed, preferably, the second clamping portion 240 may be formed by extending the two main spar caps 251 and the two shear webs 252. However, the present application is not limited thereto. Similar to the first clamping portion 140, the second clamping portion 240 may also be formed by extending any three of the two main spar caps 251 and the two shear webs 252, An example in which the second clamping portion 240 is formed by extending the two main spar caps 251 and the two shear webs 252 will be described hereinafter.

According to the embodiment of the present application, as shown in FIG. 9, the height of the second clamping portion 240 in the thickness direction D2 of the airfoil becomes greater and greater in the direction D3 getting close to the blade root.

In addition, according to the embodiment of the present application, as shown in FIG. 9, each of the two main spar caps 251 in the second clamping portion 240 is concaved with respect to an extension line of the corresponding main spar cap 251 in the second body portion 230, to form a second step t2 between the second clamping portion 240 and the second body portion 230, where a height of the second step t2 is equal to a sum of the height of the first step t1 and a thickness of the main spar cap 151 of the first main spar 150. In addition, the two shear webs 252 of the second clamping portion 240 offset respectively, in a direction allowing the two shear webs 252 to get close to each other, by a predetermined distance with respect to extension lines of the shear webs 252 of the second body portion 230, and the predetermined distance is a thickness of a shear web 152 of the first main spar 150.

In a case that the main spar caps 251 in the second clamping portion 240 are manufactured according to the design of the original main spar, when the second clamping portion 240 is to be clamp-fitted into the first clamping portion 140, the main spar caps 251 in the second clamping portion 240 and the main spar caps 151 in the first clamping portion 140 may get stuck, and thus the second clamping portion 240 cannot be clamp-fitted into the first clamping portion 140. Therefore, according to the embodiment of the present application, when the second main spar 250 is manufactured, each of the two main spar caps 251 in the second clamping portion 240 is concaved by the second step t2 in a direction allowing the two main spar caps 251 to get close to each other.

In addition, if the shear webs 252 in the second clamping portion 240 are manufactured according to the design of the original main spar, dimensions of the shear webs 252 in the second clamping portion 240 and dimensions of the shear webs 152 in the first clamping portion 140 in a chord direction of the blade are identical to each other. In order to avoid interference between the shear webs 252 and the shear webs 152 in a case that the second clamping portion 240 is clamp-fitted into the first clamping portion 140, the two shear webs 252 of the second clamping portion 240 may offset respectively, in the direction allowing the two shear webs 252 to get close to each other, by the predetermined distance with respect to extension lines of the shear webs 252 of the second body portion 230, and the predetermined distance may be the thickness of the shear web 152.

According to the embodiment of the present application, in order to reduce stress when the first clamping portion 140 and the second clamping portion 240 are clamp-fitted to each other, as shown in FIG. 6 and FIG. 9, thicknesses of the main spar caps 151 of the clamping portion 140 are gradually decreased in the direction D1 away from the blade root, and thicknesses of the main spar caps 251 of the second clamping portion 240 are gradually decreased in the direction D3 getting close to the blade root. In addition, thicknesses of the shear webs 152 of the first clamping portion 140 may also be gradually decreased in the direction D1 away from the blade root, and thicknesses of the shear webs 252 of the second clamping portion 240 may also be gradually decreased in the direction D3 getting close to the blade root, to reduce the stress when the first clamping portion 140 and the second clamping portion 240 are clamp-fitted to each other.

In addition, according to the embodiment of the present application, the main spar caps 151 of the first clamping portion 140 may have flat inner surfaces, and the main spar caps 251 of the second clamping portion 240 may have flat outer surfaces. Specifically, due to a shape of the blade, the main spar caps 151 in the first main spar 150 and the main spar caps 251 in the second main spar 250 may be arc-shaped. Therefore, when the first main spar 150 and the second main spar 250 are manufactured, the inner surfaces of the main spar caps 151 in the first clamping portion 140 and the outer surfaces of the main spar caps 251 in the second clamping portion 240 may be flattened, to avoid a gap between the main spar caps 151 in the first clamping portion 140 and the main spar caps 251 in the second clamping portion 240 during assembly.

In addition, according to the embodiment of the present application, lengths of the first clamping portion 140 and the second clamping portion 240 may be determined according to the shape and load of the blade, which are not specifically limited. In an example, the lengths of the first clamping portion 140 and the second clamping portion 240 may range from 0.5 m to 5 m.

The second clamping portion 240 in FIG. 8 may be clamp-fitted into the first clamping portion 140 through the gap 153 of the first clamping portion 140 in FIG. 5. That is, the second clamping portion 240 in FIG. 8 may enter the first clamping portion 140 from the gap 153 in FIG. 5 in a chord direction of the first blade segment 100, and thus is clamp-fitted into the first clamping portion 140. In a clamp-fitting state, the two main spar caps 251 of the second clamping portion 240 may be abutted against the two main spar caps 151 of the first clamping portion 140 respectively (as shown in FIG. 10), and one of the shear webs 252 of the second clamping portion 240 may be abutted against the shear web 152 of the first clamping portion 140 in FIG. 5.

As described above, a gap may also be formed in a case that one of the spar caps 151 is not allowed to extend. In this case, the second clamping portion 240 may enter the first clamping portion 140 from the gap in the thickness direction D2 of the airfoil of the first blade segment 100, and thus is clamp-fitted into the first clamping portion 140.

According to the embodiment of the present application, the segmented blade may further include a filling member (not shown), which may be used to fill the gap 153. For example, as shown in FIG. 5, in a case that the gap 153 is formed by a shear web 152 which is not allowed to extend, the filling member may be formed by a material same as that of the shear web 152, to fill the gap 153, so as to ensure the reliability of the blade. In addition, it should be understood that, in a case that the gap is formed by a spar cap 151 which is not allowed to extend, the filling member may be formed by a material same as that of the spar cap 151, to fill the gap.

Figure 10:
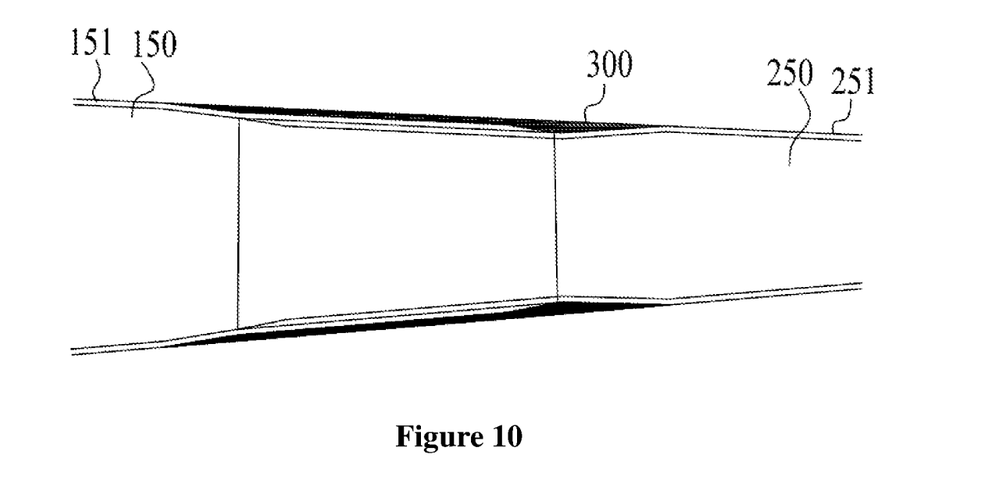
FIG. 10 is a schematic view showing that the first main spar in FIG. 6 and the second main spar in FIG. 9 are connected.
Figure 11:
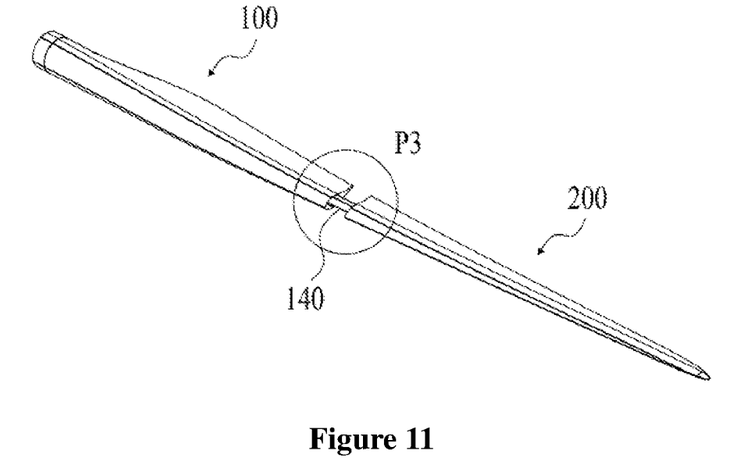
FIG. 11 is a schematic view showing that the first blade segment in FIG. 5 and the second blade segment in FIG. 7 are connected.

According to the embodiment of the present application, in order to further ensure the stability of the clamping connection between the second clamping portion 240 and the first clamping portion 140, the segmented blade may further include a reinforcing member 300, as shown in FIG. 10. For example, after the gap 153 is filled by the filling member, the reinforcing member 300 may be wound around an outer periphery of the first clamping portion 140, to achieve smooth transition between the first main spar 150 and the second main spar 250.

The reinforcing member 300 may be an insulating material, so as to prevent lightning strikes. Preferably, the reinforcing member 300 may be a reinforcing material impregnated with resin (not shown), so as to provide a stronger fastening force. Optionally, the reinforcing material may be a fiberglass cloth, such as a triaxial fiberglass cloth. However, the present application is not limited thereto, and the reinforcing member 300 may be other string-like members.

Figure 12:
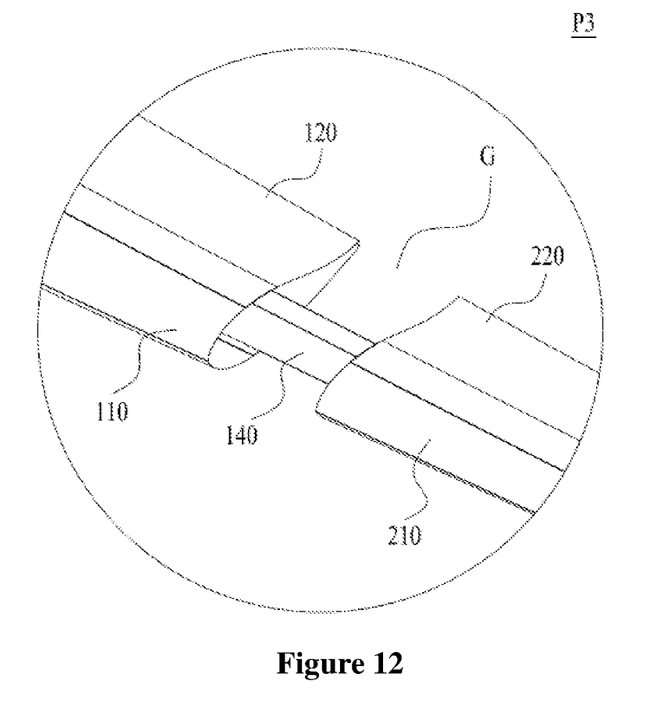
FIG. 12 is an enlarged schematic view showing a portion P3 in FIG. 11.
Figure 13:
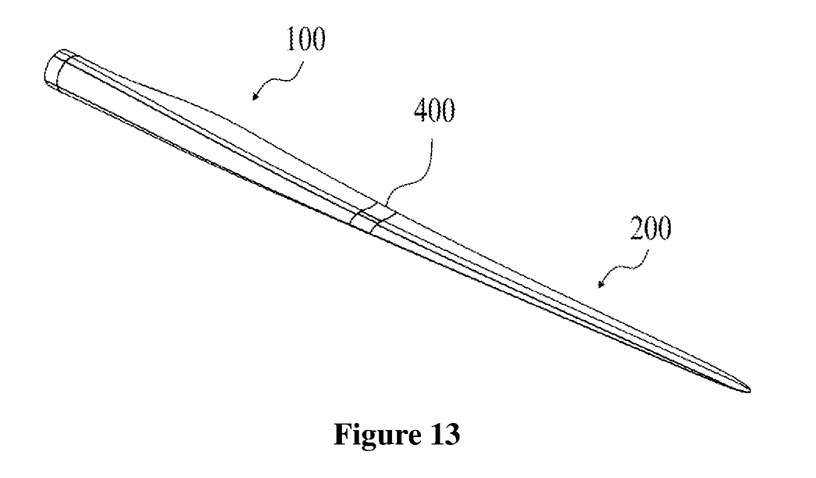
FIG. 13 is a schematic view showing that a clearance between the first blade segment and the second blade segment is encased by using an outer shell.

According to the embodiment of the present application, the outer shell 400 (as shown in FIG. 13) may be configure to encase the clearance G between the first blade segment 100 and the second blade segment 200 (as shown in FIG. 12).

Specifically, a first bonding angle and a second bonding angle may be formed at a portion of the first blade segment 100 and a portion of the second blade segment 200 adjacent to each other, respectively; the first bonding angle is formed by concaving the first blade segment 100 inwardly, and the second bonding angle is formed by concaving the second blade segment 200 inwardly. The outer shell 400 may be covered on the first bonding angle and the second bonding angle, to allow the first bonding angle and the second bonding angle to be flush with other portions of the segmented blade. For example, the outer shell 400 may be adhered to the first bonding angle and the second bonding angle by a liquid structural adhesive, and then the structural adhesive is cured.

According to the embodiment of the present application, on the basis of ensuring an aerodynamic shape of the blade, seams between the outer shell 400 and the first blade segment 100 and between the outer shell 400 and the second blade segment 200 may be reinforced. For example, the reinforcing material such as the fiberglass cloth may be laid at the seams between the outer shell 400 and the first blade segment 100 and between the outer shell 400 and the second blade segment 200, and then the resin is poured; or, the reinforcing material impregnated with the resin may be directly laid to form a reinforcing layer for reinforcement.

In addition, a reinforcing area may be polished and sprayed with a surface protective layer, and a segmented position may be sprayed with a pigment having a color different from that of a surface of the blade, so as to facilitate subsequent inspection of the blade.

It should be understood that, although the segmented blade according to the present application is described hereinbefore by taking a segmented blade including two blade segments as an example, the present application is not limited thereto, and the segmented blade may include three or more blade segments, wherein two adjacent blade segments may be connected to each other by the above-described manner of connecting through a main spar.

According to another embodiment of the present application, a wind turbine may be provided. The wind turbine may include the segmented blade as described above.

As described above, the segmented blade according to the present application makes use of a feature that the blade becomes thinner and thinner from the blade root to the blade tip, and the blade segments may be clamp-fitted together by the main spar, Compared with the bolted connection, the segmented blade according to the present application substantially does not increase the weight of the blade, therefore, a load in an oscillation direction and a fatigue load of the blade can be reduced, and the inconvenience that pre-tightening is required in the bolted connection can be avoided. In addition, compared with the structural adhesive connection, a distance between the main spar caps of the main spar becomes smaller and smaller in the direction from the blade root to the blade tip, therefore, the blade segment close to the blade tip does not come out of the blade segment close to the blade root, and thus the connection reliability is higher.

In addition, according to the embodiment of the present application, a fastener (the reinforcing material impregnated with the resin is preferably employed) can be employed to wind a portion where the two clamping portions are clamp-fitted to each other, and thus the reliability of the clamping connection between the main spars of the two blade segments clamp-fated to each other can be further improved.

Furthermore, the number of bolts is limited in the bolted connection, therefore, it cannot be realized that the blade can be segmented at any position. However, according to the segmented blade of the present application, the blade can be segmented at any position, and therefore a degree of freedom of segmentation is increased.

In addition, a manner such as plug connection or bolted connection or the like is usually employed between conventional blade segments, and metal materials are inevitably used, which not only increases the weight of the blade itself, but also may cause lightning strikes. However, according to the segmented blade of the present application, the blade segments are directly connected by insulating materials, so that the blade is light-weight and lightning strikes can be avoided.

Although an exemplary embodiment of the present application has been specifically described with reference to the exemplary embodiment, those skilled in the art should understand that various changes in forms and details may be made without departing from the spirit and scope of the application.

The invention claimed is:

1. A segmented blade, comprising:
   a first blade segment having a first main spar, wherein the first blade segment is close to a blade root, the first main spar comprises a first body portion arranged in the first blade segment and a first clamping portion extending from an end of the first body portion toward a direction away from the blade root, and a height of the first clamping portion is gradually decreased in the direction away from the blade root;
   a second blade segment having a second main spar, wherein the second blade segment is close to a blade tip, the second main spar comprises a second body portion arranged in the second blade segment and a second clamping portion extending from an end of the second body portion toward a direction getting close to the blade root, a height of the second clamping portion is gradually increased in the direction getting close to the blade root, and the second clamping portion is clamp-fitted into the first clamping portion; and an outer shell configured to encase a clearance between the first blade segment and the second blade segment, wherein the first clamping portion is formed by extending any three of two main spar caps and two shear webs of the first main spar in the direction away from the blade root.

2. The segmented blade according to claim 1, wherein each of the main spar caps in the first clamping portion is concaved with respect to an extension line of a corresponding main spar cap in the first body portion, to form a first step between the first clamping portion and the first body portion.

3. The segmented blade according to claim 2; wherein the second clamping portion is formed by extending two main spar caps and two shear webs of the second main spar in the direction getting close to the blade root.

4. The segmented blade according to claim 3, wherein each of the two main spar caps in the second clamping portion is concaved with respect to an extension line of a corresponding main spar cap in the second body portion, to form a second step between the second clamping portion and the second body portion, and a height of the second step is equal to a sum of a height of the first step and a thickness of the main spar cap of the first main spar; and the two shear webs of the second clamping portion offset respectively, in a direction allowing the two shear webs to get close to each other, by a predetermined distance with respect to extension lines of the shear webs of the second body portion, and the predetermined distance is a thickness of a shear web of the first main spar.

5. The segmented blade according to claim 1, further comprising:

a filling member; wherein the filling member is configured to fill a gap formed in the first clamping portion due to that one of the main spar caps or one of the shear webs of the first main spar that does not extend in the direction away from the blade root.

6. The segmented blade according to claim 2, further comprising:

a reinforcing member, wherein the reinforcing member is wound around an outer periphery of the first clamping portion, to realize smooth transition between the first main spar and the second main spar.

7. The segmented blade according to claim 6, wherein the reinforcing member comprises a reinforcing material impregnated with resin.

8. The segmented blade according to claim 3, wherein in the direction away from the blade root, thicknesses of the main spar caps and the shear webs of the first clamping portion are gradually decreased; and in the direction getting close to the blade root, thicknesses of the main spar caps and the shear webs of the second clamping portion are gradually decreased.

9. The segmented blade according to claim 3, wherein the main spar caps of the first clamping portion have flat inner surfaces, and the main spar caps of the second clamping portion have flat outer surfaces.

10. The segmented blade according to claim 1, wherein a first bonding angle and a second bonding angle are formed at a portion of the first blade segment and a portion of the second blade segment adjacent to each other, respectively; the first bonding angle is formed by concaving the first blade segment inwardly, and the second bonding angle is formed by concaving the second blade segment inwardly; and the outer shell is covered on the first bonding angle and the second bonding angle, to allow the first bonding angle and the second bonding angle to be flush with other portions of the segmented blade.

11. The segmented blade according to claim 1, further comprising:

a reinforcing layer, which is fitted to seams between the outer shell and the first blade segment and between the outer shell and the second blade segment.

12. A method for forming a segmented blade, comprising:

providing a first blade segment having a first main spar, wherein the first blade segment is close to a blade root, the first main spar comprises a first body portion arranged in the first blade segment and a first clamping portion extending from an end of the first body portion toward a direction away from the blade root, and a height of the first clamping portion is gradually decreased in the direction away from the blade root;

providing a second blade segment having a second main spar, wherein the second blade segment is close to a blade tip, the second main spar comprises a second body portion arranged in the second blade segment and a second clamping portion extending from an end of the second body portion toward a direction getting close to the blade root, and a height of the second clamping portion is gradually increased in the direction getting close to the blade root;

clamp-fitting the second clamping portion into the first clamping portion; and encasing, by an outer shell, a clearance between the first blade segment and the second blade segment, wherein the first clamping portion is formed by extending any three of two main spar caps and two shear webs of the first main spar in the direction away from the blade root.

13. The method according to claim 12, forming the first clamping portion by extending any three of two main spar caps and two shear webs of the first main spar in the direction away from the blade root;

forming the second clamping portion by extending two main spar caps and two shear webs of the second main spar in the direction getting close to the blade root; and since a gap is formed in the first clamping portion due to that one of the main spar caps or one of the shear webs of the first main spar does not extend in the direction away from the blade root, when the second clamping portion is clamp-fitted into the first clamping portion, clamp-fitting the second clamping portion into the first clamping portion from the gap.

14. The method according to claim 13, further comprising:

after clamp-fitting the second clamping portion into the first clamping portion and before encasing the clearance between the first blade segment and the second blade segment, filling the gap with a filling member; and after filling the gap with the filling member and before encasing the clearance between the first blade segment and the second blade segment, winding a reinforcing member around an outer periphery of the first clamping portion, to realize smooth transition between the first main spar and the second main spar.

15. A wind turbine, comprising the segmented blade according to claim 1.

16. A wind turbine, comprising the segmented blade according to claim 2.

17. A wind turbine, comprising the segmented blade according to claim 5.

18. A wind turbine, comprising the segmented blade according to claim 10.

* * * * *